Jan. 2, 1934.  A. D. TAGGART  1,941,765
WINDSHIELD WARMER
Filed Dec. 21, 1931
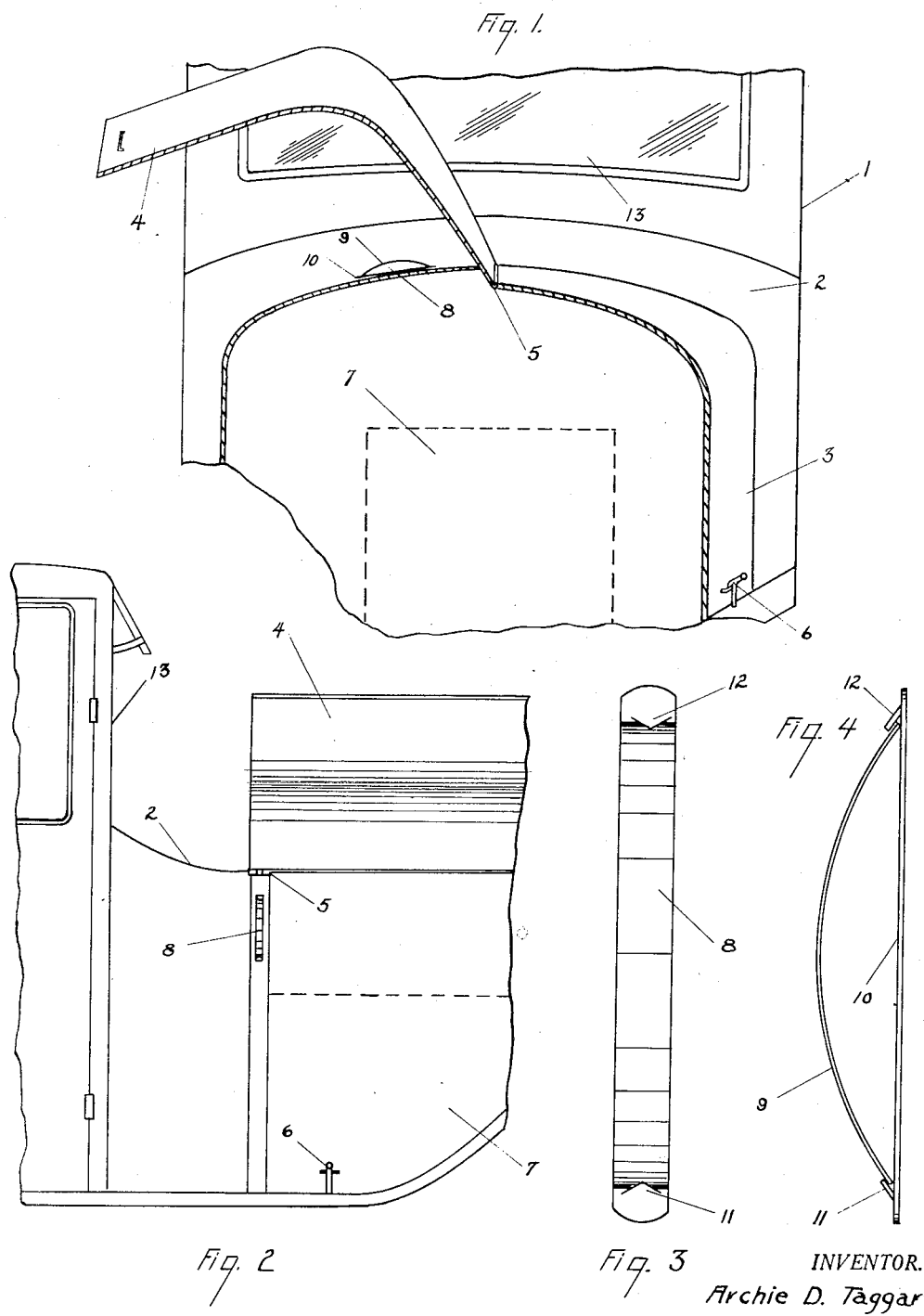
INVENTOR.
Archie D. Taggart
BY
Townsend F. Beaman.
ATTORNEY Patented Jan. 2, 1934

1,941,765

UNITED STATES PATENT OFFICE 1,941,765

WINDSHIELD WARMER

Archie D. Taggart, Cement City, Mich., assignor of one-third to Berry N. Beaman and one-third to John H. Erickson, both of Jackson, Mich.

Application December 21, 1931
Serial No. 582,332

7 Claims. (Cl. 20—40.5)

This invention relates to windshield warmers for motor vehicles.

A primary object of this invention is to provide a windshield warmer for use in driving in cold weather which will prevent ice and snow from adhering to the windshield, and also to prevent fog and moisture from collecting on the inside of the windshield due to differential temperature conditions.

Another object of this invention is to provide a simple and inexpensive device which may be readily adjusted to any make of car which will direct the hot air from the engine against the windshield thereby accomplishing the objects above set forth.

Still another object of this invention is to provide a windshield warmer of the general type shown in Patent No. 1,743,395, granted January 14, 1930, but which is simpler in construction, less expensive and is more readily attached and detached from the motor vehicle.

Another object of this invention is to provide a sheet metal vent forming structure which may be inserted between the cowl and the hood and held securely in place by merely fastening the hood latches.

With these and other objects which will appear as the description proceeds, this invention resides in the combination and arrangement of parts hereinafter described and set forth in the claims.

In the accompanying drawing wherein a convenient embodiment of my invention is set forth:

Fig. 1 is a transverse vertical section taken on a vertical plane between the radiator and the cowl of a motor vehicle.

Fig. 2 is a side elevation of the hood and the cowl portion of a motor vehicle with the hood raised and my improved windshield warmer in position.

Figs. 3 and 4 are enlarged top and side views, respectively, of my vent forming windshield warmer.

In the embodiment illustrated, a portion of the vehicle is shown at 1 having a cowl 2 and a hood consisting of side members 3 and 4 hinged at 5 in the usual manner, the side 4 of the hood being shown in a raised position. The usual hood latches are shown as 6. The engine is diagrammatically shown as 7 and furnishes the source of warm air, which is directed against the windshield by my improved vent former.

In Fig. 1, shown loosely placed on the cowl 2 in a position to be clamped by the edge of the raised hood side 4, which is supported on the cowl 2, is shown my improved vent former generally designated 8, consisting of a sheet metal arched spring member 9 and a base member 10, provided with punched abutments 11 and 12 between and against which the spring member 9 is frictionally held in an arched position.

In the operation of my improved windshield warmer, with one side of the hood raised, the vent former 8 is loosely placed on the hood edge supporting portion of the cowl 2 several inches from the hood hinge 5 with the vent former 8 in an upright position, the raised hood is lowered upon the vent former 8 and securely held in position by securing the hood latches in the usual manner.

With the side of the hood latched down upon the vent former 8, the pressure thereof deflects a substantial portion of the arch 9 to the extent that it conforms to some extent to the contour of the hood side. However, because of the abutments, the resilient arch resists being completely deformed to the extent that the hood side is distorted slightly to provide a vent or passage through which the heated air from the engine 7 passes and is impinged against the windshield 13 to warm the same to accomplish the objects hereinbefore set forth. In severe weather it is sometimes necessary to close the usual side ventilators in the hood in order to direct a necessary volume of heated air through the vent formed between the hood and the cowl.

It is obvious that this invention is not limited to any specific vent forming structure, but resides in the provision of a loosely positioned device which is held in place by securing the hood latches in the usual manner.

From the foregoing description it will be obvious to those skilled in the art that I have provided a simple and inexpensive means for directing heated air against the windshield which can be installed by a mere insertion between the edge of the hood and the cowl. Although in the description I have only described the vent former 8 as being positioned under one side of the hood, it is apparent that my improved vent former may be selectively positioned under either or both sides of the hood.

Having thus described my invention it will be seen that changes and modifications may be made therein by those skilled in the art without departing from the spirit and scope of the invention, and I do not wish to be limited to the details herein disclosed, but what I claim as new and desire to secure by Letters Patent is:

1. The combination with a vehicle having a windshield, an engine, a hood and a cowl; of means loosely inserted and entirely confined between said hood and said cowl, said means being frictionally held between said hood and said cowl and deflecting said hood to provide a vent whereby heated air from said engine is impinged against said windshield for the purpose described.

2. The combination with a vehicle having a windshield, an engine, a hood and a cowl; of an arched resilient member loosely inserted and entirely confined between said hood and said cowl, said member being frictionally held between said hood and said cowl and deflecting said hood to provide a vent whereby heated air from said engine is impinged against said windshield for the purpose described.

3. The combination with a vehicle having a windshield, an engine, a hood and a cowl; of a resilient arched member supported on a resilient base inserted and entirely confined between said hood and said cowl and deflecting said hood to provide a vent whereby heated air from said engine is impinged against said windshield for the purpose described.

4. The combination with a vehicle having a windshield, an engine, a hood and a cowl; of a resilient member inserted and entirely confined between said hood and said cowl and deflecting said hood to provide a vent whereby heated air from said engine is impinged against said windshield for the purpose described.

5. The combination with a vehicle having a windshield, an engine, a hood, hood latches and a cowl; of means loosely inserted between said hood and said cowl, said means being held in position solely by said hood latches and deflecting said hood to provide a vent whereby heated air from said engine is impinged against said windshield for the purpose described.

6. The combination with a vehicle having a windshield, an engine, a hood, hood latches and a cowl; of an arched resilient member loosely inserted between said hood and said cowl, said member being held in position solely by said hood latches and deflecting said hood to provide a vent whereby heated air from said engine is impinged against said windshield for the purpose described.

7. The combination with a vehicle having a windshield, an engine, a hood, hood latches and a cowl; of a resilient member loosely inserted between said hood and said cowl, said member being held in position solely by said hood latches and deflecting said hood to provide a vent whereby heated air from said engine is impinged against said windshield for the purpose described.

ARCHIE D. TAGGART.